United States Patent [19]

Potucek, III

[11] Patent Number: 5,490,371
[45] Date of Patent: Feb. 13, 1996

[54] DEBRIS GUARD FOR LAWN EDGER

[75] Inventor: Frank R. Potucek, III, Fox Lake, Ill.

[73] Assignee: Echo Incorporated, Lake Zurich, Ill.

[21] Appl. No.: 321,420

[22] Filed: Oct. 11, 1994

[51] Int. Cl.⁶ .......................... A01D 34/47; A01D 34/54; A01D 34/84
[52] U.S. Cl. .............................. 56/17.2; 56/17.4; 56/17.5; 56/256
[58] Field of Search .................... 56/12.1, 12.7, 56/17.4, 17.5, 17.2, 256; 172/15, 16, 17

[56] References Cited

U.S. PATENT DOCUMENTS

| | | | |
|---|---|---|---|
| 2,724,230 | 11/1955 | Burmeister | 56/17.4 |
| 3,679,003 | 7/1972 | Wadsworth | 56/256 X |
| 3,852,944 | 12/1974 | Zuercher | 56/256 X |
| 3,872,930 | 3/1975 | Campbell | 172/17 X |
| 5,179,823 | 1/1993 | Pace | 56/17.2 X |
| 5,263,303 | 11/1993 | Stroud | 56/17.2 X |

*Primary Examiner*—George A. Suchfield
*Attorney, Agent, or Firm*—Wood, Phillips, VanSanten, Clark & Mortimer

[57] ABSTRACT

An edger head for a portable edger. The edger head has a housing, a cutting element, first structure for mounting the cutting element to the housing for movement relative to the housing in a predetermined path, a debris guard, and second structure for mounting the debris guard in an operative position on the housing. The debris guard has first and second flaps, with the first flap being repositionable relative to the second flap.

22 Claims, 3 Drawing Sheets

5,490,371

DEBRIS GUARD FOR LAWN EDGER

BACKGROUND OF THE INVENTION

1. Field of the Invention

This invention relates to edgers of the type used to cut a border between a lawn and adjacent walks, driveways, etc. and, more particularly, to a guard that prevents debris from being thrown by a moving cutting element on the edger against an operator thereof.

2. Background Art

Lawn edgers are well known in the art. The most common of these edgers uses a metal blade that is rotated about a horizontal axis. The blade is directed along the edge of a walk, drive, or the like, to make a clean and sharp cut of the lawn at the transition between the lawn and the walk or drive.

One known edger construction utilizes an elongate shaft which connects between a head unit, on which the blade is mounted, and a power source. The shaft and/or power unit can be held and manipulated by the user in a substantially upright position. The head unit has a skid or wheel which bears upon the walk or driveway and serves to guide the blade along at a consistent height. The wheel or skid also acts as a fulcrum about which the unit can be pivoted to alter the depth of cutting for the blade.

With this type of unit, the blade is commonly rotated in a direction so that the blade tends to "walk" forwardly away from the operator. The blade moves downwardly into the lawn and projects grass, dirt and other debris that may be present in the lawn, rearwardly. This may pose a hazard to the user that is operating the unit from a rearward location. Those units that have an oppositely rotating blade may propel debris forwardly towards bystanders, who may be injured, or towards objects, that may be damaged. With this type of unit, there is often nothing impeding the movement of the debris coming off of the blade.

While a housing normally provided around the blade shields a portion of the blade and blocks debris that may be propelled by the blade, the rear portion of the head unit must be open to prevent interference between the housing and the lawn, which is typically higher than the level of the walk or drive.

It is known to use a flexible debris guard on lawn mowers to block a rear opening and thereby shield the operator from flying debris. However, this type of guard, if used on an edger, which is normally used to trim between two surfaces at different heights, would deflect upwardly as a unit and be guided along the higher lawn level, thereby leaving a significant gap between the debris guard and the walk or drive. There remains a substantial risk of exposure by the user to debris propelled by the blade or ricocheted, and to other hazards.

Another problem with the above type of blade guard on an edger is that it would block the blade from the line of sight of the operator. The operator is then required to guess at the precise line of the blade during operation. He/she will normally use a trial and error approach in properly locating the blade. As this is done, the blade may drift into the lawn and undesirably damage the lawn or, alternatively, strike the hard surface of the walk or drive and cause damage to the blade and/or the power unit therefor.

SUMMARY OF THE INVENTION

In one form of the invention, an edger head is provided for a portable edger. The edger head has a housing, a cutting element, first structure for mounting the cutting element to the housing for movement relative to the housing in a predetermined path, a debris guard, and second structure for mounting the debris guard in an operative position on the housing. The debris guard has first and second flaps, with the first flap being repositionable relative to the second flap.

At least a part of one, and preferably both, the flaps are made form a bendable material.

The cutting element can be a flexible element or a substantially rigid blade. The first structure mounts the cutting element for rotation in a path bounded by first and second spaced planes, with there being an opening through the debris guard to allow a user to visually line the blade cutting path up with an intended cutting line. The opening through the debris guard may intersect the space between the first and second spaced planes.

The debris guard may be made from a flexible sheet of material, with there being a split in the flexible sheet defining the first and second flaps.

The split may define adjacent edges on the first and second flaps, which edges are substantially straight and parallel to each other and the first and second planes.

The slit has a length and a width, with the width preferably being no more than one half inch.

The flexible sheet defining the debris guard is preferably made from plastic or rubber with a thickness of no more than one-quarter inch.

In one form, there are two and only two flaps defined on the debris guard.

The invention further contemplates the above structure in combination with an elongate shaft having spaced ends, a power unit, structure for attaching the edger head to one of the elongate shaft ends, structure for attaching the power unit to the other of the elongate shaft ends, and structure cooperating between the power unit and cutting element to cause the power unit to drive the cutting element.

The invention further contemplates a debris guard for a portable edger, which debris guard has a mounting portion, for connecting the debris guard to a portable edger, and two and only two flaps joined to the mounting portion, with at least one flap being repositionable relative to the other flap and the mounting portion.

The mounting portion and two flaps are preferably formed as one piece.

The invention also contemplates the debris guard in combination with structure for maintaining the mounting portion fixedly on an edger unit.

The invention further contemplates the debris guard in combination with a portable edger to which the debris guard is mounted.

DETAILED DESCRIPTION OF THE DRAWINGS

Figure 1:
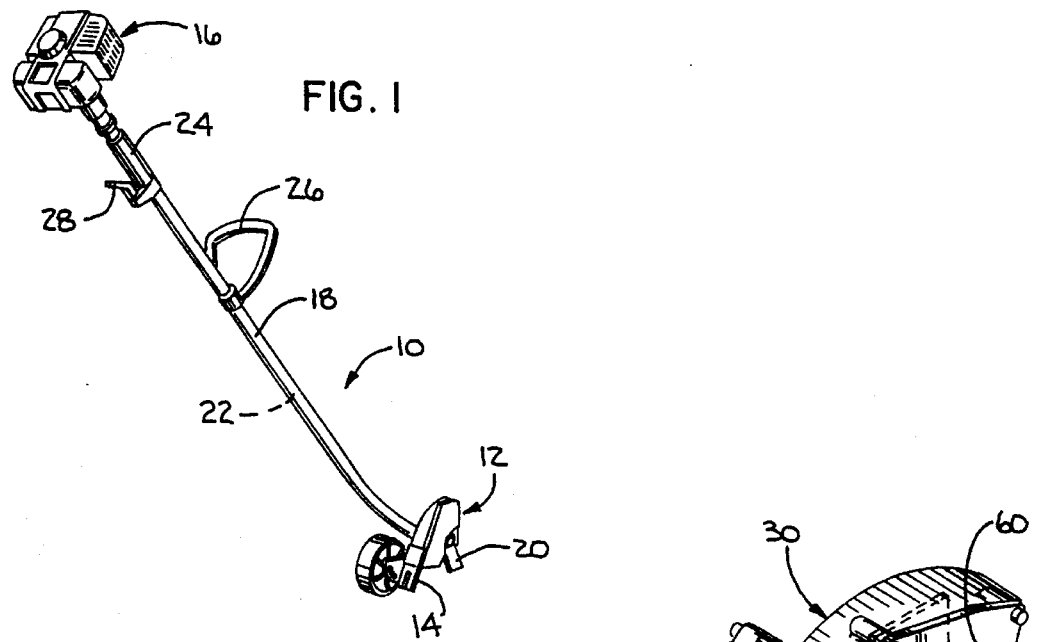
FIG. 1 is a perspective view of a portable edger with a head having a debris guard according to the present invention mounted thereon.
Figure 2:
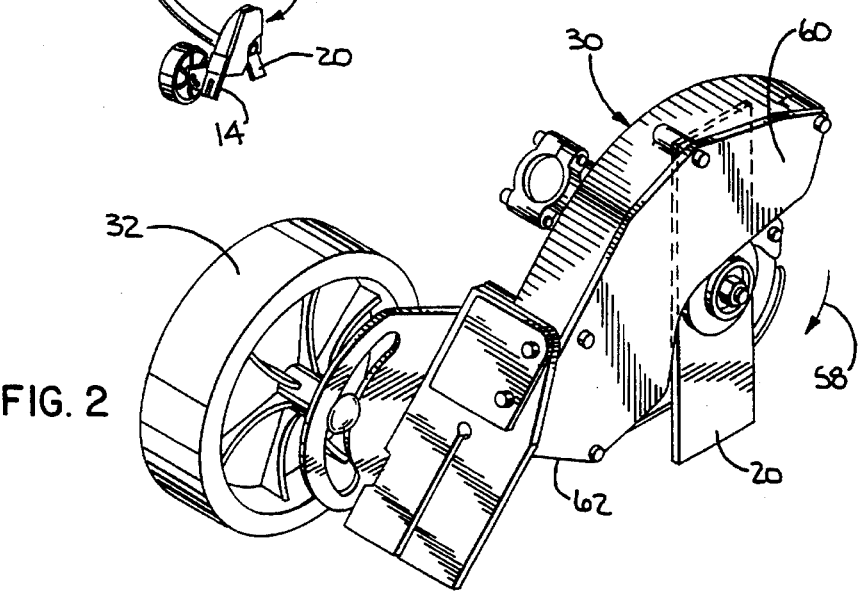
FIG. 2 is an enlarged, perspective view of the edger head on the portable edger of FIG. 2.
Figure 3:
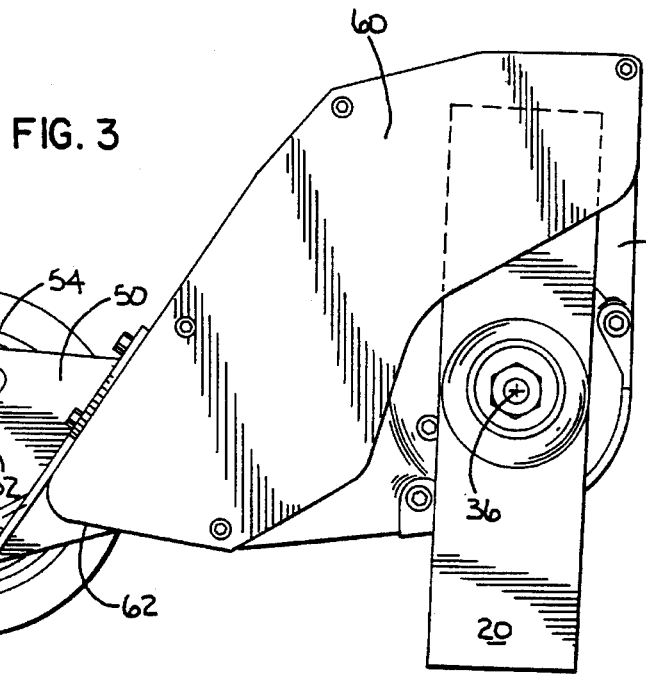
FIG. 3 is an enlarged, side elevation view of the edger head in FIG. 2.
Figure 4:
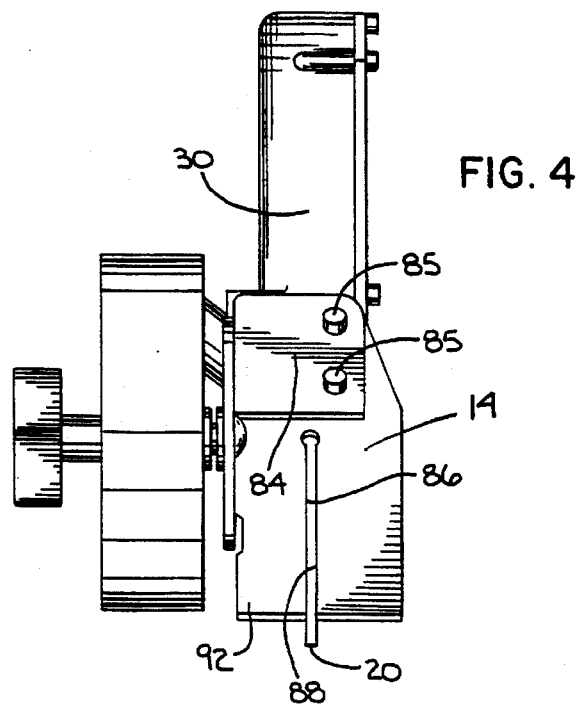
FIG. 4 is an enlarged, front elevation view of the edger head in FIGS. 2 and 3.
Figure 6:
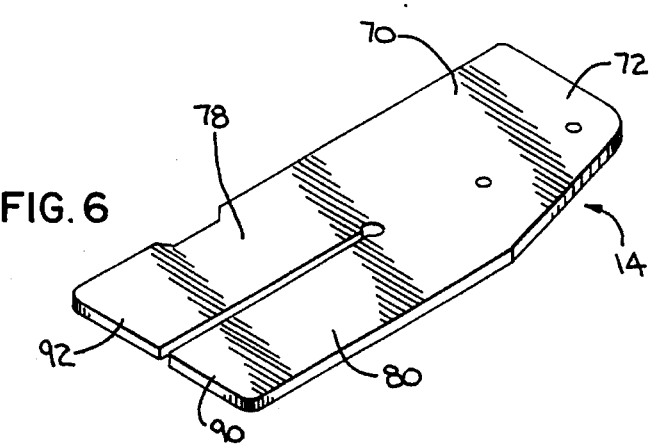
FIG. 6 is an isolated perspective view of the inventive debris guard.
Figure 7:
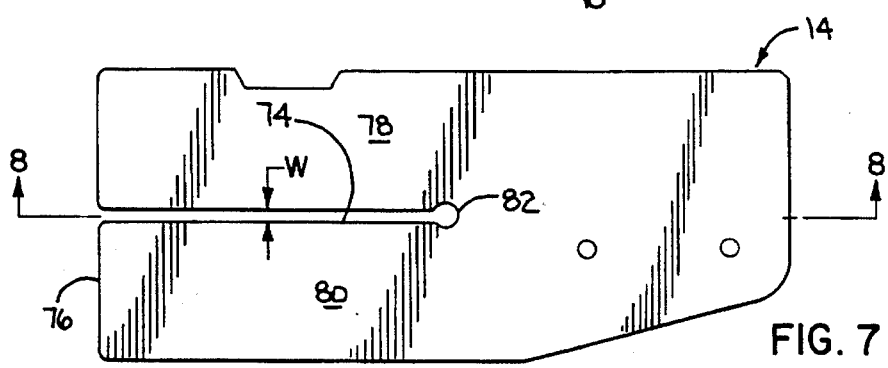
FIG. 7 is a plan view of the inventive debris guard.
Figure 8:
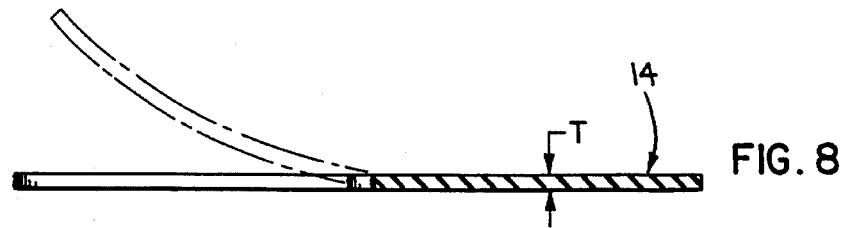
FIG. 8 is a cross-sectional view of the debris guard taken along line 8—8 of FIG. 7.

In FIG. 1, a portable edger, shown at 10, has an edger head 12 with a debris guard 14, according to the present invention, thereon. The overall configuration of the portable edger 10 is well known. Units of this type have been sold successfully by the assignee herein.

Briefly, the edger head 12 is operated by a power unit 16. An elongate shaft 18 connects between the power unit 16 and the edger head 12. Power is transmitted from the power unit 16 to a cutting element/blade 20 through a cable 22 encased by the shaft 18.

The edger 10 is held and manipulated readily through a grip 24 at the upper end of the shaft 18 and a loop-shaped handle 26 at the midportion of the shaft 18. With the grip 24 grasped by one hand of a user, a throttle trigger 28 can be conveniently accessed by a finger on the gripping hand.

As shown in greater detail in FIGS. 2–8, the edger head 12 has a housing 30 which carries a guide wheel 32 on which the edger head 12 is supported in use. The cutting element 20 is shown as a flat metal blade. However, the cutting element 20 could be a flexible line, or have another type of known construction. The blade 20 is journalled for rotation relative to a wall 34 on the housing 30 about a laterally extending axis 36. With the blade 20 rotated about the axis 36, the blade 20 moves in a path which is bounded by spaced planes traced by the oppositely facing flat surfaces 38, 40 on the blade 20.

Figure 5:
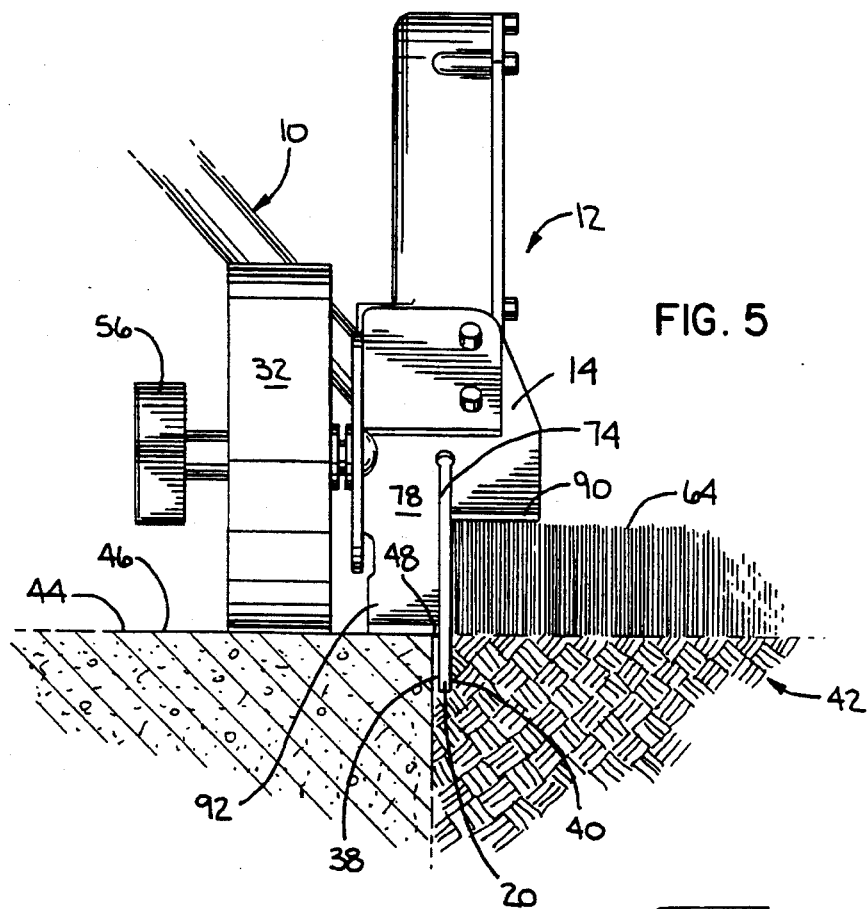
FIG. 5 is a view as in FIG. 4 with the edger head in an operative position edging between a walk/drive and lawn.

The edger 10 is designed to cut a clean edge in a lawn 42 where it meets a hard, formed surface, such as a walk, drive, etc. 44. The guide wheel 32 is laterally offset from the blade 20 and can be guided along the upper surface 46 of the walk/drive 44 to advance the edger 10. Through the grip 24 and handle 26, the user can controllably guide the blade 20 along the edge 48 of the walk/drive 44, as shown in FIG. 5, from an upright position. The user can pivot the housing 30 around the wheel to vary the height of the blade 20 relative to a surface on which the wheel 32 bears in use.

The housing 30 has an associated bracket 50 to which the guide wheel 32 mounts. The guide wheel 32 has a center shaft 52 that is slidable guidingly in an arcuate slot 54 in the bracket 50 to allow variation in the height of the wheel 32 relative to the bracket 50. A nut 56, that can be conveniently grasped by the user, is used to lock the shaft 52 with the wheel 32 in a desired position relative to the bracket 50.

The blade 20 rotates in the direction of the arrow 58 in use. Some units do have a blade 20 that rotates in the opposite direction. The invention is usable in the same manner thereon. As the blade 20 rotates, it tends to pick up and propel dirt, grass and other debris rearwardly towards the operator. The housing 30 defines a shroud 60 which extends over the top of the blade 20 and acts as a guard to prevent inadvertent contact between the operator and the blade 20. The shroud 60, to a certain extent, also blocks rearward discharge of debris picked up by the blade 20. However, the rear edge 62 of the shroud 60 terminates at a point high enough that it will not be dragged through the upwardly projecting blades of grass 64 as the edger 10 is operated. As a result, in the absence of the inventive debris guard 14, the user would be exposed directly to the rotating blade 20 along a line extending beneath the housing edge 62.

Figure 9:
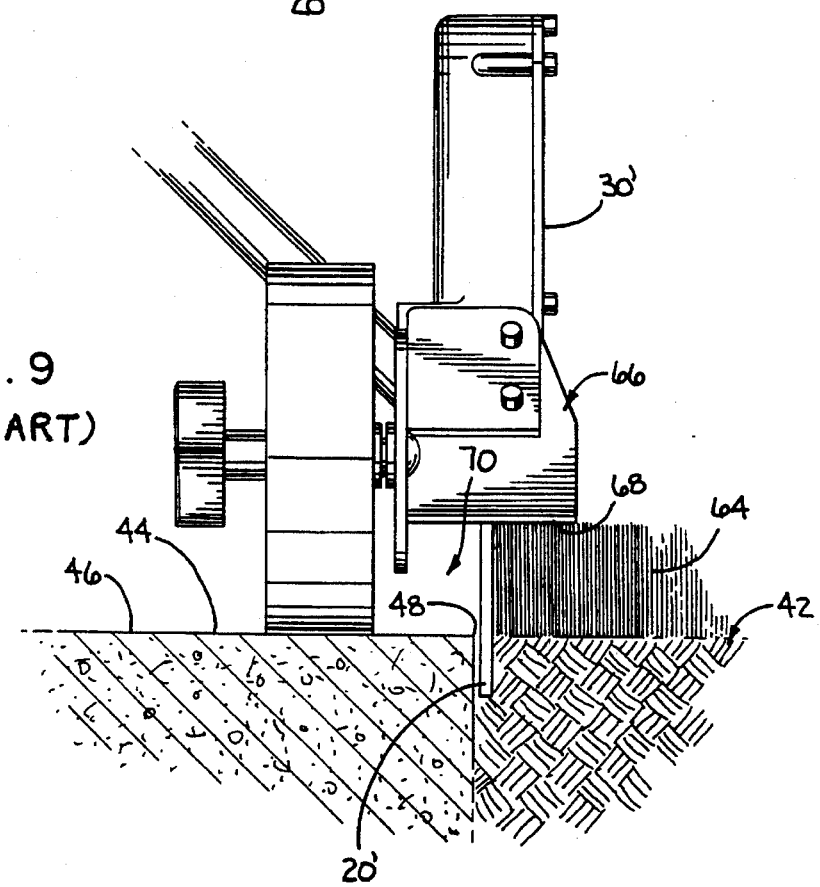
FIG. 9 is a view as in FIG. 5 with a debris guard that is not made according to the present invention.

It is known to use flexible debris guards, as at the rear of a lawn mower housing, to block the passage of debris from a rotating cutting blade towards an operator. If a conventional flat debris guard, as shown at 66 in FIG. 9, were attached to a housing 30' in FIG. 9, similar to that on the edger 10, the entire bottom edge 68 of the debris guard 66 would deflect up and ride along the top of the grass 64. This would leave the region at 70 beneath the debris guard 66, on the wheel side of the blade 20', unshielded so that debris could be propelled by the blade 20' dangerously towards the operator.

The inventive debris guard 14 is constructed to obviate this problem. As seen in FIGS. 1–8, the debris guard 14 has a generally rectangular body 70 with an upper mounting portion 72. A slit/opening 74 extends upwardly from the bottom edge 76 of the body 70 to a location mid-height on the body 70. The slit 74 divides the lower body portion to define first and second flaps 78, 80, respectively. The slit 74 has a width W that is preferably less than one-half inch. The slit 74 terminates at an enlarged, rounded portion 82 at its upper end.

The debris guard 14 is preferably formed as one piece from a single sheet of rubber or plastic. The sheet has a thickness T that is preferably no more than one-quarter inch. Accordingly, the flaps 78, 80 can be readily repositioned relative to one another by flexing of the body material to conform to underlying surfaces over which they ride. The debris guard could also be formed using multiple pieces and would function in the same manner. For example, a brush-like guard with bendable bristles could be constructed to effectively block the passage of debris from off of the blade 20.

A mounting plate 84 captively holds the mounting portion 72 of the debris guard 14 against the housing 30. The mounting plate 84 is removably held in place by bolts 85. The debris guard 14 could alternatively be mounted to the shaft 18 or another part of the edger 10 by means, and in a manner, well known to those skilled in the art.

The edges 86, 88 on the flaps 78, 80 defined by the slit 74 are substantially vertical and parallel to the planes bounding the path of movement of the blade 20. In a preferred form, the slit 74 has a width equal to or less than that of the blade 20 with the edge 88 residing in the plane containing the surface 40 and the edge 46 residing in the plane containing the blade surface 38. Accordingly, the operator can use the slit 74 as a sighting line for the path of the blade 20. The user is thus not required to guess as to the lateral location of the blade 20. As a result, the user can consistently line the blade 20 up with the edge 48 of the walk/drive 44 to prevent excessive cutting of the lawn 42, in the event that the head 12 drifts in one direction, and contact with the walk/drive 44, in the event that the head 12 drifts in the other direction.

Another function of the inventive debris guard 14 is to substantially fully seal the region behind the blade 20 underneath the edge 62 so that the user is safely shielded from flying debris coming off the blade 20. This is made possible by the separate flaps 78, 80. The lower portion 90 of the flap 80, as seen in FIG. 5, will bend up and sweep along the top of the grass 64. The lower end 92 of the flap 78 will sweep along the upper surface 46 of the walk/drive. By having the flaps 78, 80 independently deformable, the flaps 78, 80 will conform to surfaces on a lawn and walk/drive that are at the same height or at significantly different heights.

The only opening in the guard 14 for debris to pass from the blade to the operator is that defined by the slit 74. Since the slit 74 has the same dimension as the blade, i.e., a minimal thickness, no debris of any substantial size can pass therethrough. The slit 74 may be even narrower, for example only wide enough to prevent interference between the flaps 78, 80 as they relatively reposition in use.

The foregoing disclosure of specific embodiments is intended to be illustrative of the broad concepts comprehended by the invention.

I claim:

1. An edger head for a portable edger, said edger head comprising:

a housing;

a cutting element;

first means for mounting the cutting element to the housing for movement relative to the housing in a predetermined path;

a debris guard; and second means for mounting the debris guard in an operative position on the housing, said debris guard comprising first and second flaps, said first flap being repositionable relative to the second flap and the housing, said second flap being repositionable relative to the first flap and the housing.

2. The edger head for a portable edger according to claim 1 wherein at least a part of the first flap is made from a sheet of bendable material.

3. The edger head for a portable edger according to claim 1 wherein the debris guard has two and only two flaps.

4. An edger head for a portable edger, said edger head comprising:

a housing;

a cutting element;

first means for mounting the cutting element to the housing for movement relative to the housing in a predetermined path;

a debris guard; and second means for mounting the debris guard in an operative position on the housing, said debris guard comprising first and second flaps, said first flap being repositionable relative to the second flap, wherein at least a part of each of the first and second flaps is made from a bendable material.

5. An edger head for a portable edger, said edger head comprising:

a housing;

a cutting element;

first means for mounting the cutting dement to the housing for movement relative to the housing in a predetermined path;

a debris guard; and second means for mounting the debris guard in an operative position on the housing;

said debris guard comprising first end second flaps, said first flap being repositionable relative to the second flap, wherein the cutting element comprises a substantially rigid blade, further wherein the first means mounts the blade for rotation in a path bounded by the first and second spaced planes and there is an opening through the debris guard to allow a user of the edger head on a portable edger to visually line the blade cutting path up with an intended cutting line.

6. The edger head for a portable edger according to claim 5 wherein the opening through the debris guard intersects the space between the first and second spaced planes.

7. An edger head for a portable edger, said edger head comprising:

a housing;

a cutting element;

first means for mounting the cutting element to the housing for movement relative to the housing in a predetermined path;

a debris guard; and second means for mounting the debris guard in an operative position on the housing, said debris guard comprising first and second flaps, said first flap being repositionable relative to the second flap, wherein the debris guard comprises a flexible sheet of material and there is a slit in the flexible sheet of material defining the first and second flaps.

8. The edger head for a portable edger according to claim 7 wherein the slit defines adjacent edges on the first and second flaps and the edges on the first and second flaps are substantially straight and parallel to each other.

9. The edger head for a portable edger according to claim 8 wherein the cutting element moves in a path bounded by first and second spaced planes and the edges of the first and second flaps are substantially parallel to the first and second spaced planes.

10. The edger head for a portable edger according to claim 7 wherein the flexible sheet comprises at least one of plastic and rubber having a thickness of no more than ¼ inch.

11. An edger head for a portable edger, said edger head comprising:

a housing:

a cutting element;

first means for mounting the cutting element to the housing for movement relative to the housing in a predetermined path;

a debris guard; and second means for mounting the debris guard in an operative position on the housing, said debris guard comprising first and second flaps, said first flap being repositionable relative to the second flap, there being in combination with the edger head an elongate shaft having spaced ends, a power unit, means for attaching the edger head to one of the elongate shaft ends, means for attaching the power unit to the other of the elongate shaft ends and means cooperating between the power unit and cuffing element to cause the power unit to drive the cutting element.

12. An edger head for a portable edger, said edger head comprising:

a housing;

a cutting element;

first means for mounting the cutting element to the housing for movement relative to the housing in a predetermined path;

a debris guard; and second means for mounting the debris guard in an operative position on the housing, said debris guard comprising first and second flaps, said first flap being repositionable relative to the second flap, wherein a slit defines the first and second flaps, said slit having a length and a width, with the width being no more than ½ inch.

13. A debris guard for a portable edger, said debris guard comprising:

a mounting portion for connecting the debris guard to a portable edger unit; and two and only two flaps joined to the mounting portion with each of the flaps being repositionable relative to the other flap and the mounting portion.

14. The debris guard for a portable edger according to claim 13 in combination with means for maintaining the mounting portion fixedly on a portable edger.

15. The debris guard for a portable edger according to claim 13 wherein the mounting portion and two flaps are formed as one piece.

16. The debris guard for a portable edger according to claim 13 in combination with a portable edger to which debris guard is mounted.

17. A debris guard for a portable edger, said debris guard comprising:

a mounting portion for connecting the debris guard to a portable edger unit; and two and only two flaps joined to the mounting portion with at least one of the flaps being repositionable relative to the other flap and the mounting portion, wherein the mounting portion and two flaps are formed as one piece, further wherein the mounting portion and two flaps are defined by a flexible sheet that is at least one of plastic and rubber.

18. The debris guard for a portable edger according to claim 17 wherein the flexible sheet has a thickness of no more than ¼ inch.

19. A debris guard for a portable edger, said debris guard comprising:

a mounting portion for connecting the debris guard to a portable edger unit; and two and only two flaps joined to the mounting portion with at least one of the flaps being repositionable relative to the other flap and the mounting portion, wherein the two flaps are defined by a slit having a length and a width, with the width being less than ½ inch.

20. The debris guard for a portable edger according to claim 19 wherein the slit defines an edge on each of the flaps and the flap edges are substantially straight and parallel to each other.

21. An edger head for a portable edger, said edger head comprising:

a housing;

a cutting element;

first means for mounting the cutting element to the housing for movement relative to the housing in a predetermined path;

a debris guard; and second means for mounting the debris guard in an operative position on the housing, wherein the debris guard has independent flexible elements that are deflectable to conform to surfaces of different height to block passage of foreign matter propelled by the cutting element towards an operator.

22. An edger comprising:

a power unit;

a housing;

an elongate shaft connecting between the power unit and housing;

a cutting element;

first means for mounting the cutting element to at least one of the housing and shaft for movement relative to the housing in a predetermined path;

a debris guard; and second means for mounting the debris guard in an operative position to at least one of the power unit, housing, and elongate shaft, wherein the debris guard has independent flexible elements that are deflectable to conform to surfaces of different height to block passage of foreign matter propelled by the cutting element towards an operator.

* * * * *